United States Patent
Saitou et al.

(10) Patent No.: US 11,325,552 B2
(45) Date of Patent: May 10, 2022

(54) VEHICLE SEAT

(71) Applicant: TACHI-S CO., LTD., Tokyo (JP)

(72) Inventors: Satoyuki Saitou, Tokyo (JP); Takayuki Yoshika, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 78 days.

(21) Appl. No.: 16/883,104

(22) Filed: May 26, 2020

(65) Prior Publication Data
US 2020/0377050 A1 Dec. 3, 2020

(30) Foreign Application Priority Data

May 27, 2019 (JP) .............................. JP2019-098713

(51) Int. Cl.
B60R 21/207 (2006.01)
B60N 2/68 (2006.01)
B60R 21/215 (2011.01)
B60N 2/64 (2006.01)

(52) U.S. Cl.
CPC .............. B60R 21/207 (2013.01); B60N 2/68 (2013.01); B60R 21/215 (2013.01); B60N 2/64 (2013.01)

(58) Field of Classification Search
CPC ....... B60R 21/207; B60R 21/215; B60N 2/64; B60N 2/68
See application file for complete search history.

(56) References Cited

U.S. PATENT DOCUMENTS 5,651,582 A 7/1997 Nakano
6,155,593 A * 12/2000 Kimura ................. B60R 21/207
280/728.2
9,296,352 B2 * 3/2016 Fujiwara ............. B60R 21/2171
2011/0095513 A1 * 4/2011 Tracht .................. B60N 2/5816
280/730.2
2021/0078518 A1 * 3/2021 Tanabe ..................... B60N 2/64

FOREIGN PATENT DOCUMENTS

| CN | 105564357 A | * | 5/2016 |
| JP | H08-242967 A | | 9/1996 |
| JP | 09132102 A | * | 5/1997 |

OTHER PUBLICATIONS

Nakano et al., Air Bag Device of Vehicular Seat, May 20, 1997, EPO, JP 09-132102 A, Machine Translation of Description (Year: 1997).*

* cited by examiner

Primary Examiner — James A English
(74) Attorney, Agent, or Firm — Paratus Law Group, PLLC

(57) ABSTRACT

A vehicle seat includes an airbag device, an attachment bracket with which the airbag device is fixed to the side frame member of a seat back, a cushion pad covering a front side and a lateral side of the back frame, and a side panel attached to the side frame member. The attachment bracket includes an airbag fixing portion that protrudes laterally from the side frame member. The airbag device is disposed on a front side of the airbag fixing portion and is fixed to the airbag fixing portion with bolts that penetrate the airbag fixing portion from the front side of the airbag fixing portion to a rear side of the airbag fixing portion. The side panel covers a lateral side and the rear side of the airbag fixing portion and constructs an external shape of the side surface of the seatback together with the cushion pad.

5 Claims, 8 Drawing Sheets

VEHICLE SEAT

CROSS REFERENCE TO RELATED APPLICATIONS

This application claims priority to Japanese Patent Application No. 2019-098713 filed on May 27, 2019, the content of which is incorporated herein by reference.

BACKGROUND

Field of the Invention

The present invention relates to a vehicle seat.

Related Art

A automotive seat disclosed in JP-Hei-8-242967-A includes an airbag device disposed on a lateral side of a side frame member of a seatback. The side frame member is made of a plate material, and the airbag device is fixed to the side frame member with bolts that penetrate the side frame. Further, the side frame member to which the airbag device is fixed is covered with a cushion pad, and the cushion pad forms an external shape of a side surface of the seat back.

For the automotive seat, one design includes the side frame member of the seatback made of a pipe material to achieve high rigidity, to reduce weight, and the like. In the automotive seat disclosed in JP-Hei-8-242967-A, the airbag device is fixed to the side frame member with bolts penetrating the side frame member, the side frame member made of a pipe material lengthen the bolts. Long blot may occur rattling or the like due to the elongation or inclination of the bolt, which is not preferable. To address this, a bracket may be joined to the side frame member, and the airbag device may be fixed to the bracket. However, a distal end of the bolt with which the airbag device is fixed to the bracket is disposed on an outer side of the side frame member. In this case, the distal end of the bolt is to be covered to meet safety requirements.

SUMMARY

Illustrative aspects of the present invention provide a vehicle seat in which, regardless of a shape of a side frame member of a seatback, an airbag device is to be attached to the side frame member.

According to an illustrative aspect of the present invention, a vehicle seat includes: a back frame including a side frame member extending along a side surface of a seat back; an airbag device disposed on a lateral side of the side frame member; an attachment bracket with which the airbag device is fixed to the side frame member; a cushion pad covering a front side of the back frame facing toward a sitting surface of the seat back and a lateral side of the back frame facing toward the side surface of the seat back; and a side panel attached to the side frame member. The attachment bracket includes an airbag fixing portion that protrudes laterally from the side frame member. The airbag device is disposed on a front side of the airbag fixing portion and is fixed to the airbag fixing portion with one or more bolts that penetrate the airbag fixing portion from the front side of the airbag fixing portion to a rear side of the airbag fixing portion. The side panel covers a lateral side and the rear side of the airbag fixing portion and constructs an external shape of the side surface of the seat back together with the cushion pad.

DETAILED DESCRIPTION OF THE EXEMPLARY EMBODIMENTS

Figure 1:
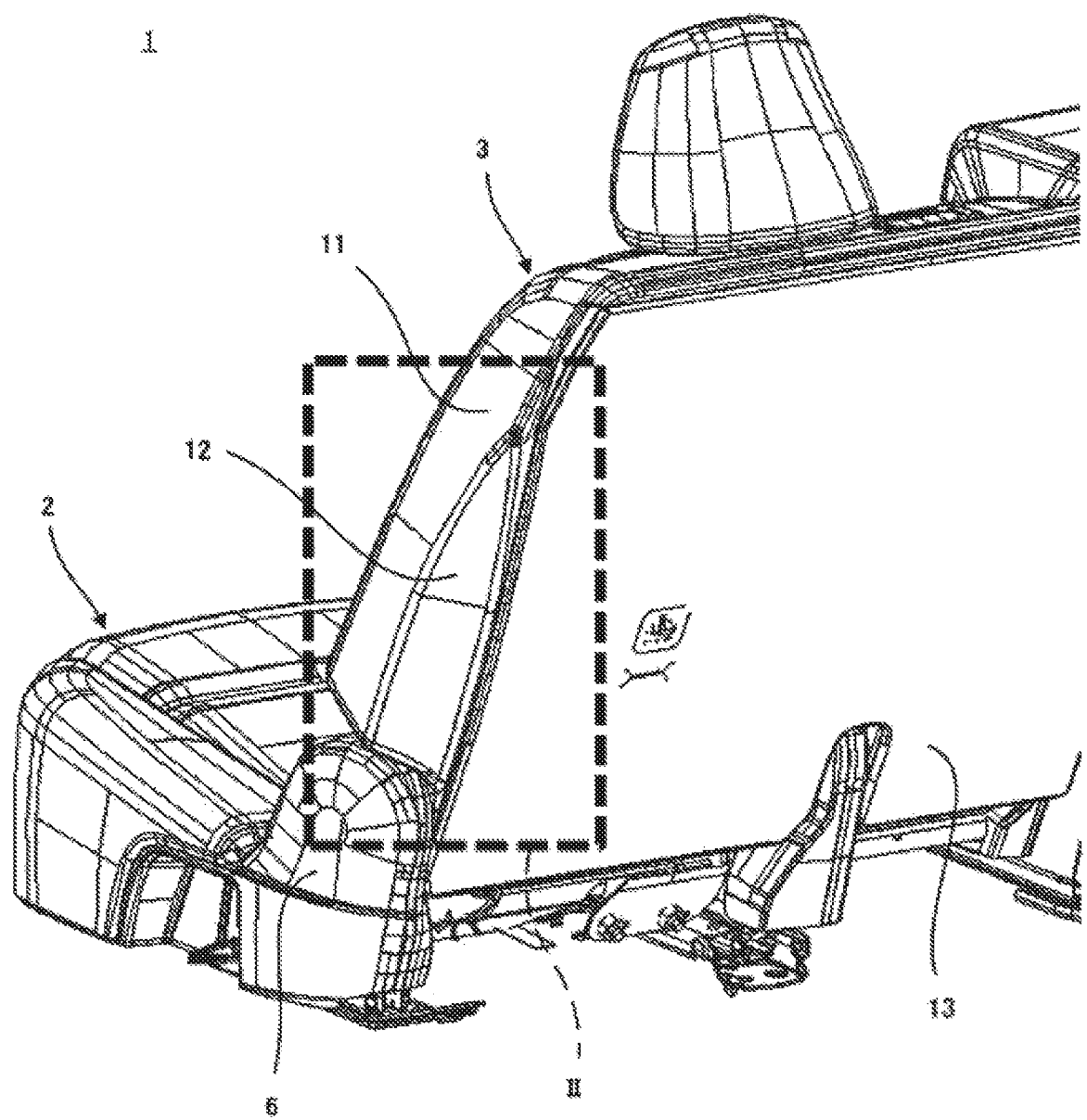
FIG. 1 is a perspective view showing a vehicle seat according to an embodiment of the invention.
Figure 2:
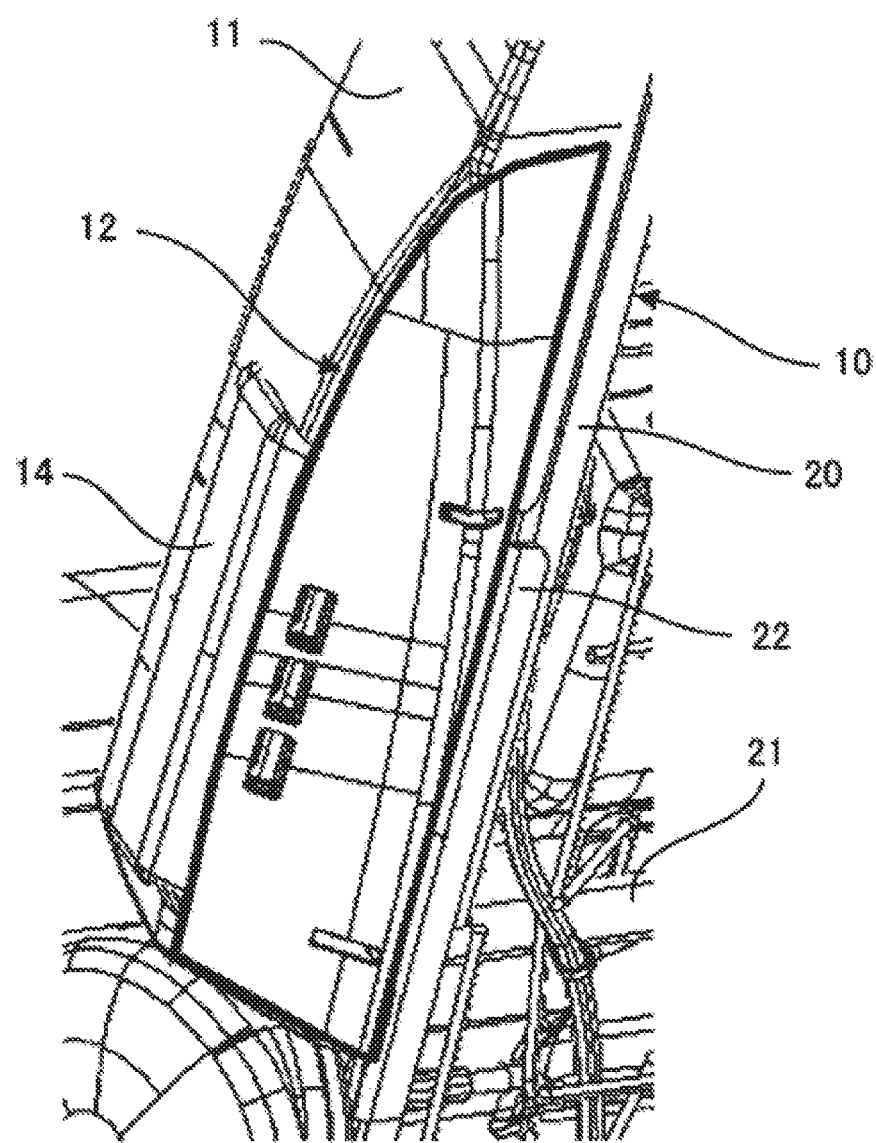
FIG. 2 is an enlarged view of region II in FIG. 1.
Figure 3:
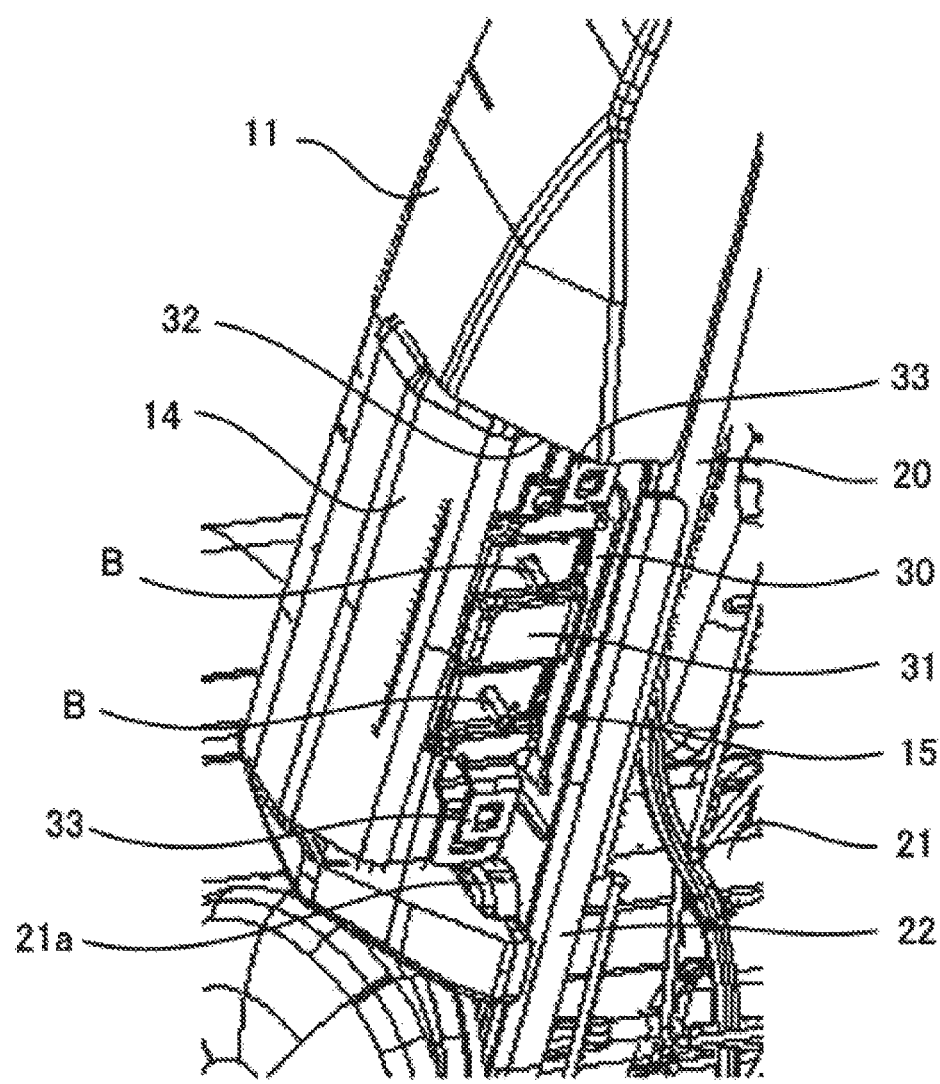
FIG. 3 is an enlarged view of region II in FIG. 1, illustrating a state where a side panel is removed.

FIG. 1 shows a vehicle seat according to an embodiment of the invention.

A vehicle seat 1 shown in FIG. 1 is a seat mounted on a vehicle such as an automobile, and is a bench-style rear seat on which a plurality of occupants can be seated side by side. The seat 1 includes a seat cushion 2 that supports the buttocks and thighs of the occupant seated on the seat 1, and a seatback 3 that supports the waist and the back of the seated occupant. The seatback 3 is connected to the seat cushion 2 by a reclining device 6, and is tiltable with respect to the seat cushion 2.

The seat cushion 2 includes a cushion frame (not illustrated) made of metal, which forms a framework of the seat cushion 2. The cushion frame is covered with a cushion pad made of a relatively soft resin foam such as urethane foam, and the cushion pad is covered with a trim cover made of skin material such as leather, woven fabric, or non-woven fabric.

The seatback 3 includes a metal back frame 10 that forms a framework of the seatback 3, a cushion pad 11 that covers the back frame 10, a side panel 12, and a back panel 13.

The back frame 10 includes a pair of side frame members 20 that are spaced apart from each other in a seat width direction and extend in an upper-lower direction, an upper frame member (not illustrated) that connects upper end portions of the pair of side frame members 20, and a lower frame member (cross member) 21 that connects lower end portions of the pair of side frame members 20.

Each of the side frame member 20 and the lower frame member 21 is made of a pipe material. (See FIG. 4). The side frame member 20 extends along aside surface of the seatback 3, and a side bracket 22 made of a plate material is welded to the lower end portion of the side frame member 20. The side frame member 20 is connected to the reclining device 6 via the side bracket 22. The lower frame member 21 is welded to the side bracket 22, and connects the lower end portions of the pair of side frame members 20. The lower frame member 21 penetrates the side bracket 22, and a distal end portion 21a of the lower frame 21 protrudes laterally from the side frame member 20.

A front side of the back frame 10, which is facing toward a sitting surface of the seatback 3, is covered with the cushion pad 11 made of a relatively soft resin foam such as urethane foam, a lateral side of the back frame 10, which is facing toward the side surface of the seatback 3 is covered with the cushion pad 11 and the side panel 12, and a rear side of the back frame 10 is covered with the back panel 13. The side panel 12 is made of resin such as polypropylene (PP) resin, acrylonitrile-butadiene-styrene copolymer (ABS) resin, or the like.

The seatback 3 further includes an airbag device 14, and an attachment bracket 15 with which the airbag device 14 is attached to the side frame member 20.

The attachment bracket 15 is made of a plate material, and includes abase portion 30 and an airbag fixing portion 31 that is bent and raised from the base portion 30. The base portion 30 is welded to the side frame member 20 or the side bracket 22. The airbag fixing portion 31, which is bent and raised with respect to the base portion 30, protrudes laterally from the side frame member 20.

The airbag device 14 is fixed to the airbag fixing portion 31 of the attachment bracket 15, and is disposed on a lateral side of the side frame member 20. A side portion of the cushion pad 11 that covers the lateral side of the back frame 10 has a cutout portion 32, and the cutout portion 32 accommodates the airbag device 14 therein.

The side panel 12 is attached to the side frame 20 to cover the cutout portion 32. In this example, a pair of side panel fixing portions 33 extends vertically from the airbag fixing portion 31 along the side frame member 20, and the side panel 12 is fixed to the side panel fixing portion 33 and is attached to the side frame member 20. The side panel 12 attached to the side frame member 20 constructs an external shape of the side surface of the seatback 3 together with the cushion pad 11. The cushion pad 11 and the side frame member 20 are integrally covered with a trim cover 16 (see FIG. 4) made of skin material such as leather, woven fabric, or non-woven fabric.

Figure 4:
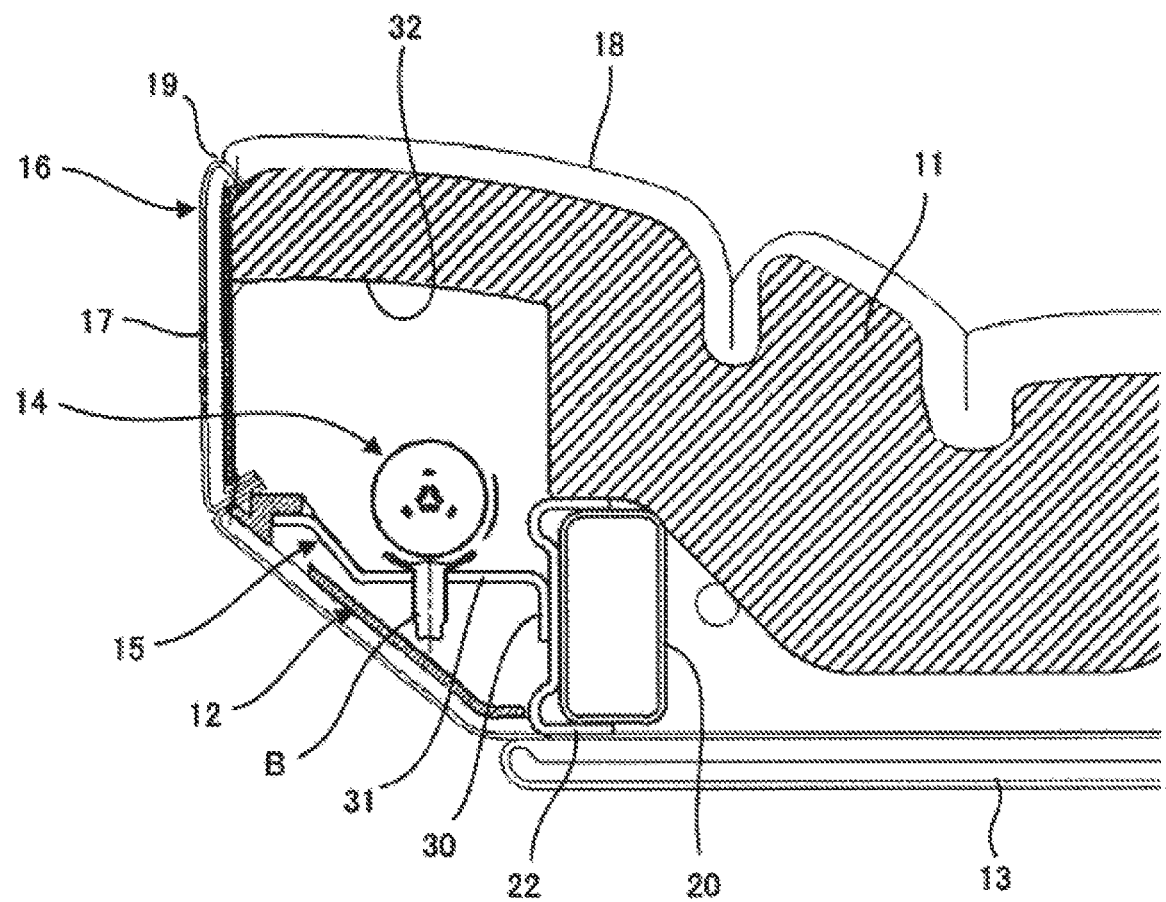
FIG. 4 is a cross-sectional view of a seatback.
Figure 5:
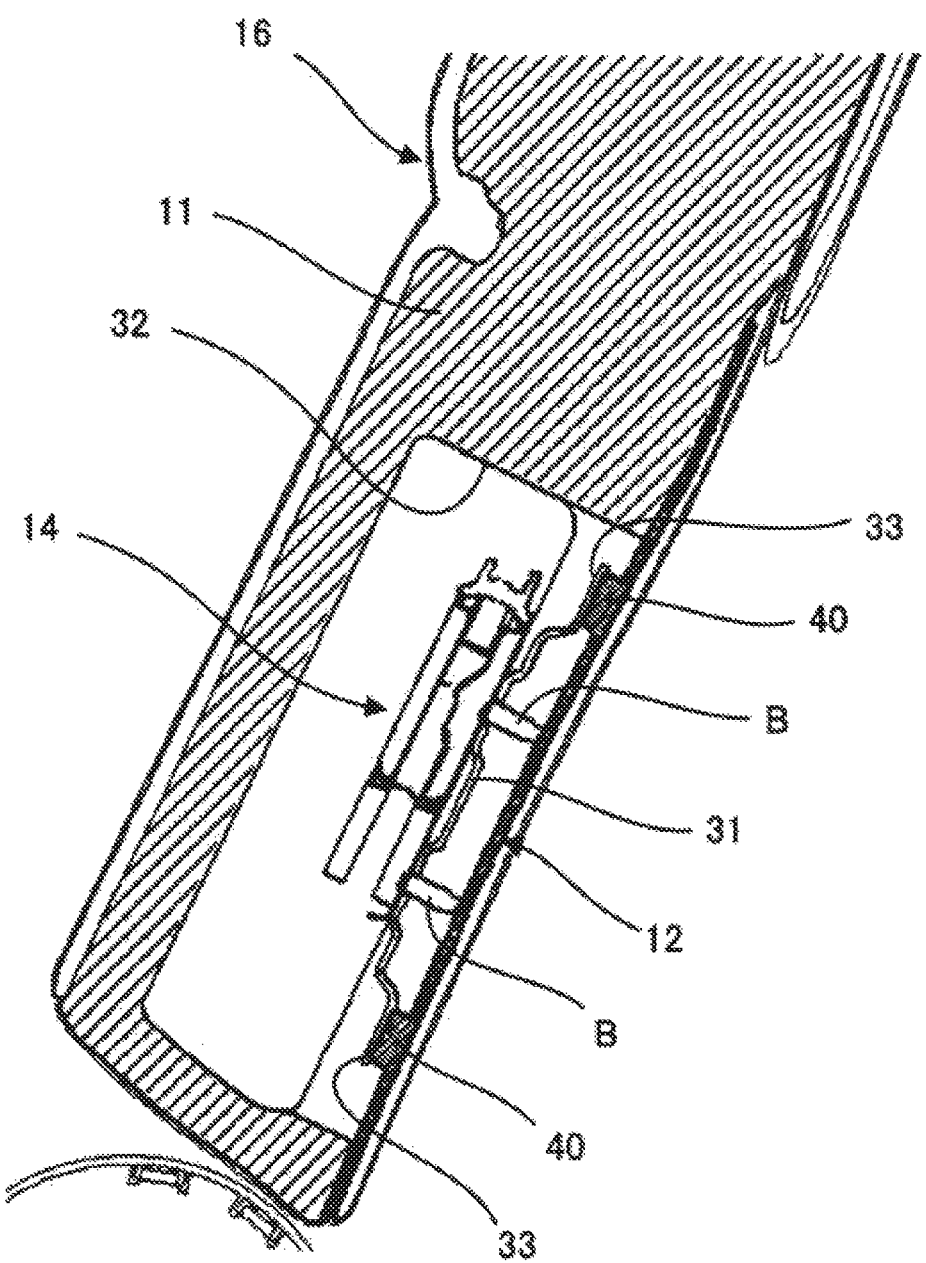
FIG. 5 is a longitudinal sectional view of the seatback.

FIGS. 4 and 5 show cross sections of the seatback 3.

As shown in FIGS. 4 and 5, the airbag device 14 is disposed on a front side of the airbag fixing portion 31 of the attachment bracket 15. A pair of bolts B is implanted in the airbag device 14, and the bolts B penetrates the airbag fixing portion 31 from the front side to a rear side. A nut (not illustrated) is screwed onto the bolt B that penetrates the airbag fixing portion 31, and the airbag device 14 is fastened to the airbag fixing portion 31 by the bolt B and the nut.

The cutout portion 32 of the cushion pad 11, which accommodates the airbag device 14, is open laterally. An airbag inflated when the airbag device 14 is activated firstly expands laterally and is guided to a front side of the seatback 3 by a webbing (not illustrated) sewn to a body portion 18 of the trim cover 16. Then, the airbag tears a sewn portion 19 where a gusset portion 17 and the body portion 18 are sewn, and inflates forward. Further, the cutout portion 32 is also open rearward. This allows the cushion pad 11 to be easily mounted on the back frame 10 from the front side of the back frame 10.

The cutout portion 32 being open laterally and rearward exposes a lateral side and a rear side of the airbag fixing portion 31 outside of the cushion pad 11. Consequently, a distal end of the bolt B that penetrates the airbag fixing portion 31 from the front side to the rear side appears outside of the cushion pad 11. However, the side panel 12 is attached to the side frame member 20 to cover the cutout portion 32, covering the lateral side and the rear side of the airbag fixing portion 31 and also covering the distal end of the bolt B.

As described above, the airbag device 14 is attached to the side frame 20 via the attachment bracket 15 made of a plate material, the attachment bracket 15 allows the airbag device 14 to be reliably fixed even when the side frame 20 is made of a pipe material.

Although the distal end of the bolt B, with which the airbag device 14 is fixed to the attachment bracket 15, faces a rear side of the seatback 3, the side panel 12 covers the distal end of the bolt B, satisfying safety requirements.

Further, the side panel 12 constructs the external shape of the side surface of the seatback 3, and this allows easy determination whether the side panel 12 is attached, that is, whether the distal end of the bolt B is covered, even in a state where the seatback 3 is covered with the trim cover 16. This provides more efficient inspection of the seat 1.

Next, a configuration of the side panel 12 will be described with reference to FIGS. 6 to 8.

Figure 6:
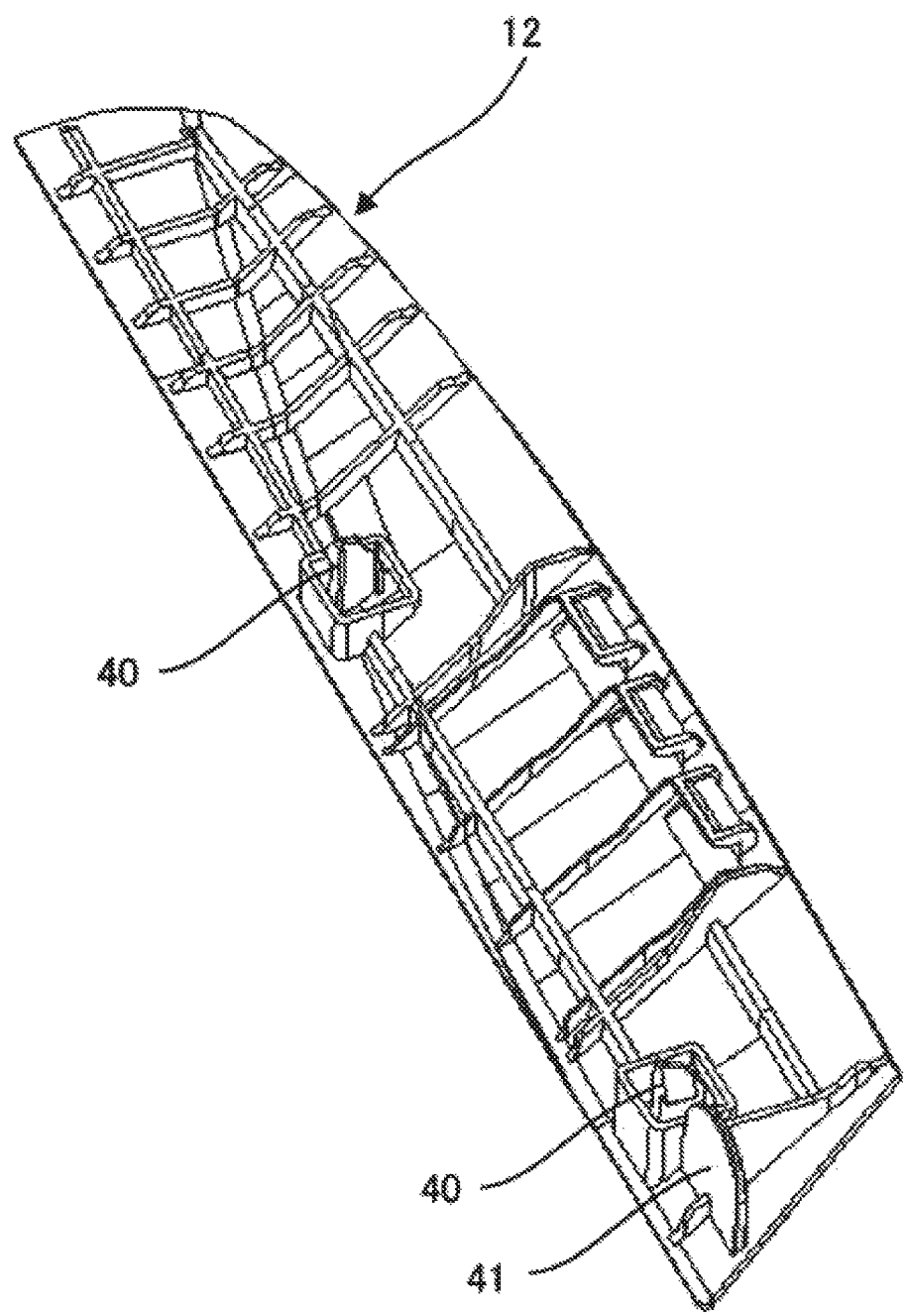
FIG. 6 is a perspective view of the side panel.

As shown in FIG. 6, the side panel 12 includes, on a rear surface thereof, an engaging portion 40 that engages with the side panel fixing portion 33 of the attachment bracket 15, and a shielding portion 41 that covers the distal end portion 21a of the lower frame member 21 which protrudes laterally from the side frame member 20. The side panel 12 is made of resin such as PP resin or ABS resin, and the engaging portion 40 and the shielding portion 41 are formed integrally with the side panel 12.

Figure 7:
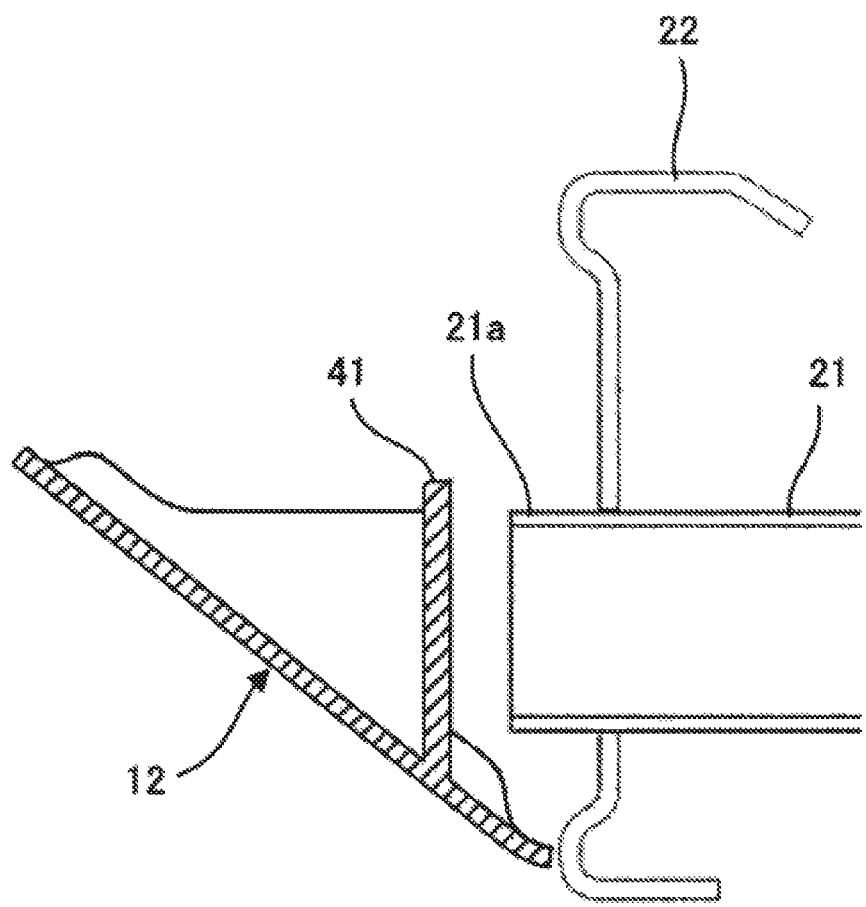
FIG. 7 is a partial cross-sectional view of the seatback, including a shielding portion of the side panel.
Figure 8:
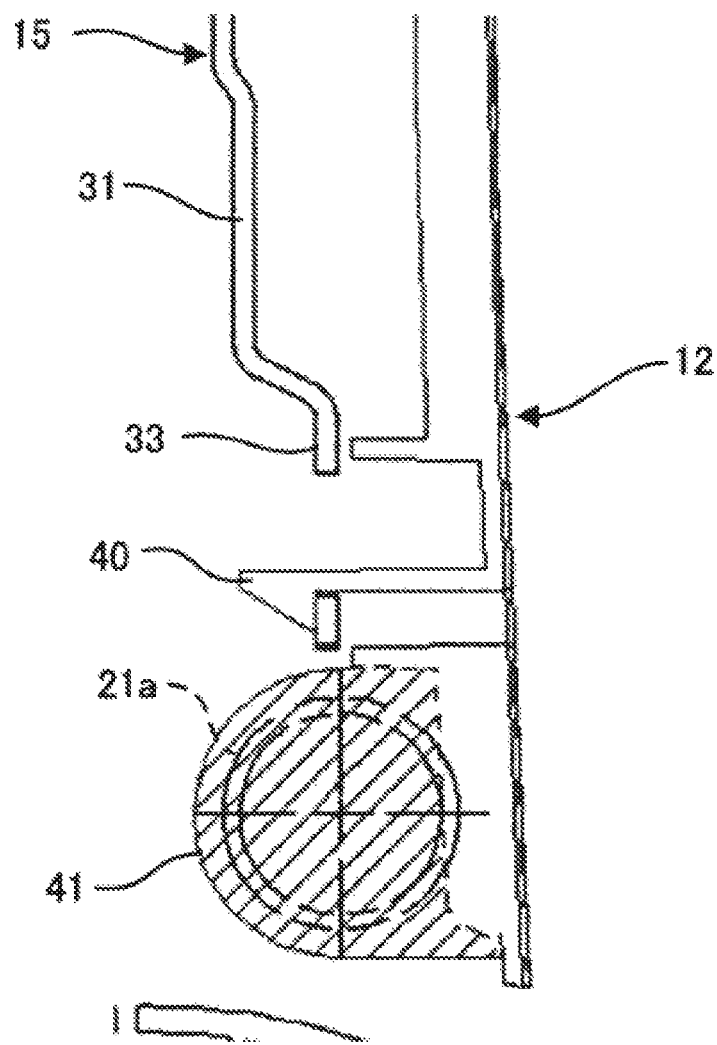
FIG. 8 is a partial longitudinal cross-sectional view of the seatback, including the shielding portion of the side panel.

As shown in FIG. 7, in a state where the engaging portion 40 is engaged with the side panel fixing portion 33 and the side panel 12 is attached to the side frame member 20, the shielding portion 41 is disposed adjacent to the distal end portion 21a of the lower frame member 21 in a longitudinal direction of the lower frame member 21.

The distal end portion 21a of the lower frame member 21 is positioned in the vicinity of the airbag device 14 and can interfere with a deployment trajectory of the inflating airbag. However, the shielding portion 41 overlaps with the distal end portion 21a, and shields the distal end portion 21a from the airbag. This prevents the inflating airbag from coming into contact with an edge of the distal end portion 21a and bursting. Preferably, as shown in FIG. 8, when viewed in the longitudinal direction of the lower frame member 21, the shielding portion 41 is formed as a cover plate having external dimensions larger than those of the distal end portion 21a of the lower frame member 21.

Although a cap member may be attached to the distal end portion 21a of the lower frame 21, the shielding portion 41 integrally formed with the side panel 12 brings reduction of the number of components. Further, the side panel 12 constructs the external shape of the side surface of the seatback 3, and this allows easy determination whether the side panel 12 is attached, that is, whether the distal end portion 21a of the lower frame member 21 is shielded, even in a state where the seatback 3 is covered with the trim cover 16. This provides more efficient inspection of the seat 1.

Although the invention has been described by taking the seat 1 installed on a vehicle such as an automobile as an example, the configuration of the seat 1 can also be applied to a vehicle seat installed on other vehicles such as a ship or an aircraft.

According to the embodiments of the invention described above, a vehicle seat includes: a back frame including a side frame member extending along a side surface of a seatback; an airbag device disposed on a lateral side of the side frame member; an attachment bracket with which the airbag device is fixed to the side frame member; a cushion pad covering a front side of the back frame facing toward a sitting surface of the seatback and a lateral side of the back frame facing toward the side surface of the seatback; and a side panel attached to the side frame member. The attachment bracket includes an airbag fixing portion that protrudes laterally from the side frame member. The airbag device is disposed on a front side of the airbag fixing portion and is fixed to the airbag fixing portion with one or more bolts that penetrate the airbag fixing portion from the front side of the airbag fixing portion to a rear side of the airbag fixing portion. The side panel covers a laterall side and the rear side of the airbag fixing portion and constructs an external shape of the side surface of the seatback together with the cushion pad.

The side frame may be made of a pipe material.

The attachment bracket may include a side panel fixing portion to which the side panel is fixed.

The back frame may include a protruding portion that protrude laterally from the side frame member, and the side panel may include a shielding portion that shields the protruding portion from an airbag of the airbag device.

The shielding portion may be a cover plate that overlaps a distal end of the protruding portion, and external dimensions of the shielding portion may be larger than external dimensions of the distal end of the protruding portion when the shielding portion and the protruding portion are viewed in an overlapping direction.

The protruding portion may be a distal end portion of a cross member joined to the side frame member.

What is claimed is:

1. A vehicle seat comprising:
    a back frame including a side frame member extending along a side surface of a seatback;
    an airbag device disposed on a lateral side of the side frame member;
    an attachment bracket with which the airbag device is attached to the side frame member;
    a cushion pad covering a front side of the back frame facing toward a sitting surface of the seatback and a lateral side of the back frame facing toward the side surface of the seatback; and
    a side panel attached to the side frame member,
    wherein the attachment bracket includes an airbag fixing portion that protrudes laterally from the side frame member,
    the airbag device is disposed on a front side of the airbag fixing portion and is fixed to the airbag fixing portion with one or more bolts that penetrate the airbag fixing portion from the front side of the airbag fixing portion to a rear side of the airbag fixing portion,
    the side panel covers a lateral side and the rear side of the airbag fixing portion and constructs an external shape of the side surface of the seatback together with the cushion pad,
    the back frame includes a protruding portion that protrudes laterally from the side frame member, and
    the side panel includes a shielding portion that shields the protruding portion from an airbag of the airbag device.

2. The vehicle seat according to claim 1, wherein the side frame member is made of a metal pipe.

3. The vehicle seat according to claim 1, wherein the attachment bracket includes a side panel fixing portion to which the side panel is fixed.

4. The vehicle seat according to claim 1, wherein the shielding portion is a cover plate that overlaps a distal end of the protruding portion, and external dimensions of the shielding portion is larger than external dimensions of the distal end of the protruding portion when the shielding portion and the protruding portion are viewed in an overlapping direction.

5. The vehicle seat according to claim 1, wherein the protruding portion is a distal end portion of a cross member joined to the side frame member.

* * * * *